United States Patent
Andrew et al.

(10) Patent No.: US 6,633,310 B1
(45) Date of Patent: Oct. 14, 2003

(54) SWITCHABLY TRANSLUCENT AND OPAQUE GRAPHICAL USER INTERFACE ELEMENTS

(75) Inventors: Felix G. T. I. Andrew, Seattle, WA (US); Kevin B. Gjerstad, Seattle, WA (US); Yutaka Suzue, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 09/583,438

(22) Filed: May 31, 2000

(51) Int. Cl.[7] .................................................. G06F 3/00
(52) U.S. Cl. ...................................... 345/728; 345/768
(58) Field of Search ................................. 345/728, 768, 345/803, 856, 804, 805

(56) References Cited

U.S. PATENT DOCUMENTS

| | | |
|---|---|---|
| 5,287,102 A | 2/1994 | McKiel, Jr. |
| 5,581,670 A * | 12/1996 | Bier et al. .................. 345/856 |
| 5,621,906 A | 4/1997 | O'Neill et al. |
| 5,933,141 A * | 8/1999 | Smith .......................... 725/39 |
| 5,999,191 A * | 12/1999 | Frank et al. ................ 345/634 |
| 6,072,489 A * | 6/2000 | Gough et al. ............... 345/803 |
| 6,232,957 B1 * | 5/2001 | Hinckley .................... 345/156 |
| 6,252,595 B1 * | 6/2001 | Birmingham et al. ....... 345/803 |
| 6,424,357 B1 * | 7/2002 | Frulla et al. ................ 345/728 |

* cited by examiner

*Primary Examiner*—Cao (Kevin) Nguyen
(74) *Attorney, Agent, or Firm*—Shook, Hardy & Bacon LLP (57) ABSTRACT

Elements of a graphical user interface that are switchably translucent and opaque are disclosed. In one embodiment, such an element is initially set to a default, first mode in which the element is translucent when the pointer is not positioned over the element. When the pointer has been moved such that it is positioned over the element, the element becomes opaque. Various heuristics are also disclosed that are applicable to the opaque-to-translucent and the translucent-to-opaque transformations. For example, when the pointer is moved over the element, there may be a delay prior to the element becoming opaque. As another example, when the pointer remains over the element for a predetermined amount of time, the element may revert back to translucency from opacity.

25 Claims, 9 Drawing Sheets

SWITCHABLY TRANSLUCENT AND OPAQUE GRAPHICAL USER INTERFACE ELEMENTS

FIELD OF THE INVENTION

This invention relates generally to graphical user interfaces in which a pointer is moved via control of the user to navigate among different interface elements, and more particularly to such elements that are switchably translucent and opaque within such user interfaces.

BACKGROUND OF THE INVENTION

Graphical user interfaces have become a mainstay with personal computers. In most such interfaces, the user controls movement of a pointer with a pointing device such as a mouse or a touch pad. The pointer is moved to navigate among elements of a user interface, such as windows, dialog boxes, toolbars, etc. When a pointer is moved so that it is positioned over a given element, the element receives subsequent mouse button clicks (where the buttons of the pointing device are referred to as mouse buttons within the art regardless of whether the pointing device is actually a mouse or not). For example, when the user clicks the mouse button while the pointer is positioned over the element, the element is typically made active, so that, for example, subsequent keystrokes entered on the keyboard are then received by the element.

A disadvantage to graphical user interfaces is that the number of windows a user may desire to have open can cause the screen to become cluttered. For example, a user may have a window for a news-related Internet web site, another window for an instant-messaging service, an expanded toolbar for a digital music player, and a window for a word processor in which the user is actually working and which is active. Thus, while the window for the word processor is arguably the most important to the user since that is the one he or she is currently working in, the other windows—and other interface elements such as toolbars, etc.—may nevertheless also be important, because they are conveying information that the user may still wish to see. Unfortunately, they can also be more of a hindrance than a help to the user, since ultimately they occupy parts of the screen that would otherwise be used by the word processor window.

Current solutions within the prior art to this problem include the user minimizing any window that is not active, so that it is substantially if not completely hidden from view, or resizing the window so that it occupies less screen space. However, these and other prior art solutions are problematic, because they result in information being hidden from the user that he or she may need or want to see. For example, if the user is keeping an news-related Internet web site window open to see when a particular story is first covered on the site, minimizing the window or making it smaller can frustrate this objective. For such reasons, as well as other reasons, there is a need for the present invention.

SUMMARY OF THE INVENTION

The present invention relates to graphical user interface elements that are switchably translucent and opaque. In one embodiment, such an element is initially set to a default, first mode in which the element is translucent when the pointer is not positioned over the element. When the pointer has been moved such that it is positioned over the element, the element becomes opaque. In other embodiments, various heuristics are applied to the opaque-to-translucent and the translucent-to-opaque transformations. For example, when the pointer is moved over the element, there may be a delay prior to the element becoming opaque. As another example, when the pointer remains over the element for a predetermined amount of time, the element may revert back to translucency from opacity.

Embodiments of the invention provide for advantages not found within the prior art. Graphical user interface elements, such as toolbars, windows, dialog boxes, etc., can remain on the screen, thus conveying information to the user while not obscuring the active window or other element in which the user is currently working. This is accomplished by these non-active elements becoming translucent, such that the active element underneath is displayed through the non-active elements to some degree. For example, a user working in a word processor window, but monitoring a news-related web site window, can have the latter window become translucent, such that the information in the word processor window is displayed through, but such that information in the news-related web site window is nevertheless still visible to some degree. When the user then wishes to view the web site window more clearly, he or she can move the pointer over this window, to cause it to become opaque.

The invention includes computerized systems, computer-implemented methods, computer-readable and machine-readable media, and computers and computerized devices of varying scope. Embodiments, aspects and advantages of the invention besides those described in this summary will become apparent by reference to the detailed description that follows, and to the conjoing drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Example Computer or Computerized Device

Figure 1:
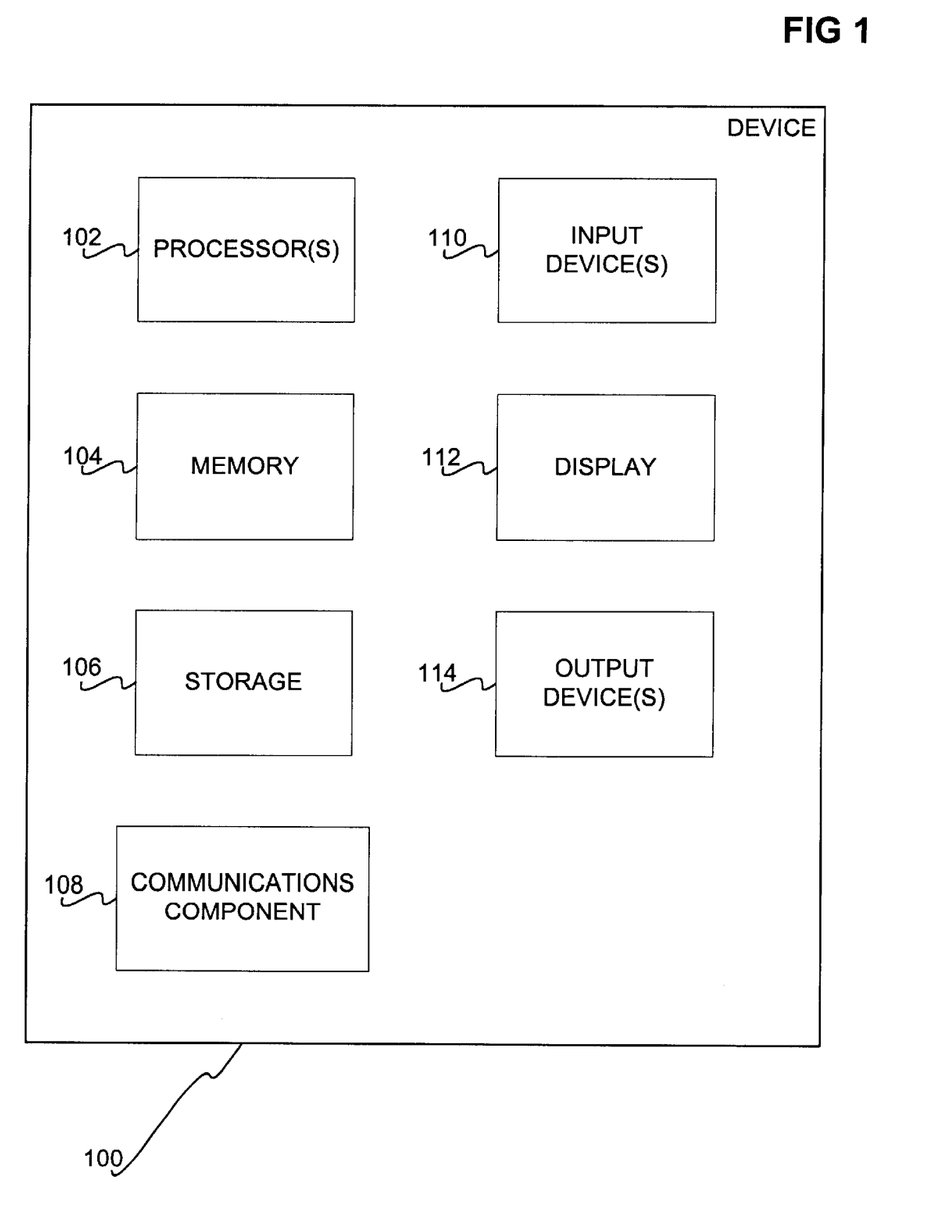
FIG. 1 is a diagram of an example computer or computerized device in conjunction with which embodiments of the invention can be implemented.

Referring to FIG. 1, a diagram of an example computer or computerized device 100 in conjunction with which embodiments of the invention may be practiced is shown. The example computerized device can be, for example, a desktop computer, a laptop computer, a personal digital assistant (PDA), a cell phone, etc.; the invention is not so limited. The description of FIG. 1 is intended to provide a brief, general description of a suitable computerized device in conjunction with which the invention may be implemented. Those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network.

The device 100 includes one or more of the following components: processor(s) 102, memory 104, storage 106, a communications component 108, input device(s) 110, a display 112, and output device(s) 114. It is noted, that for a particular instantiation of the device 100, one or more of these components may not be present. For example, a PDA may not have any output device(s) 114, while a cell phone may not have storage 106, etc. Thus, the description of the device 100 is to be used as an overview as to the types of components that typically reside within such a device 100, and is not meant as a limiting or exhaustive description of such computerized devices.

The processor(s) 102 may include a single central-processing unit (CPU), or a plurality of processing units, commonly referred to as a parallel processing environment. The memory 104 may include read only memory (ROM) 24 and/or random access memory (RAM) 25. The storage 106 may be any type of storage, such as fixed-media storage devices such as hard disk drives, flash or other non-volatile memory, as well as removable-media storage devices, such as tape drives, optical drives like CD-ROM's, floppy disk drives, etc. The storage and their associated computer-readable media provide non-volatile storage of computer-readable instructions, data structures, program modules and other data. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used.

Because the device 100 may operate in a network environment, such as the Internet, intranets, extranets, local-area networks (LAN's), wide-area networks (WAN's), etc., a communications component 108 can be present in or attached to the device 100. Such a component 108 may be one or more of a network card, such as an Ethernet card, an analog modem, a cable modem, a digital subscriber loop (DSL) modem, an Integrated Services Digital Network (ISDN) adapter, etc.; the invention is not so limited. Furthermore, the input device(s) 110 are the mechanisms by which a user indicates input to the device 100. Such device (s) 110 include keyboards, pointing devices, microphones, joysticks, game pads, satellite dishes, scanners, etc. The display 112 is how the device 100 typically shows output to the user, and can include, for example, cathode-ray tube (CRT) display devices, flat-panel display (FPD) display devices, etc. In addition, the device 100 may indicate output to the user via other output device(s) 114, such as speakers, printers, etc.

Graphical User Interface According to an Embodiment of the Invention

In this section of the detailed description, a graphical user interface according to an embodiment of the invention is described. Different variations and extensions of this interface are then described in the next section of the detailed description. The description presented in this section is made in conjunction with FIGS. 2 and 3, which are diagrams illustrating a graphical user interface according to an embodiment of the invention.

Figure 2:
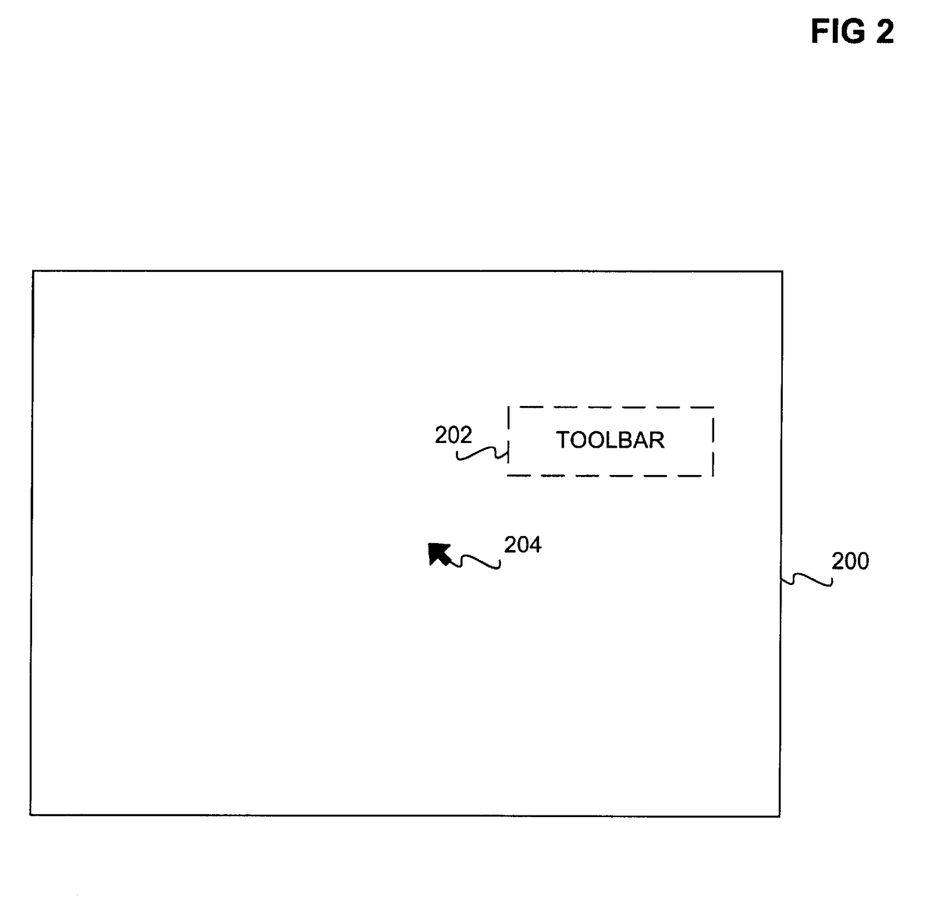
FIGS. 2 and 3 are diagrams illustrating an embodiment of the invention in which a graphical user interface element switches between translucency and opacity depending on the position of a pointer.

Referring to FIG. 2, a diagram of a display screen 200 in which a graphical user interface element 202 and a pointer 204 are displayed is shown. The display screen 200 may be that of a display device of a computer or a computerized device such as is described in the previous section of the detailed description. The element 202 as shown in FIG. 2 is what is known within the art as a toolbar; however, the invention itself is not so limited. A non-limiting list of other such graphical user interface elements includes windows, dialog boxes, etc. The pointer 204 is the manner by which elements within the graphical user interface are selected, moved, resized, used, etc., as known within the art—that is, the manner by which the elements are pointed to. The pointer 204 as shown in FIG. 2 is an arrow, but this is for example purposes only. The pointer 204 is typically controlled by a user with a pointing device, such as a mouse, touch pad, etc., or another input device, such as a keyboard.

As shown in FIG. 2, the graphical user interface element 202 has a dotted-line boundary, to indicate for illustrative purposes that it is in a first, default mode in which the element 202 is displayed in a translucent manner. This translucent mode generally applies when the pointer 204 is not positioned over the element 202, as is the case in FIG. 2, although extensions and variations described in the next section of the detailed description can deviate from this. Translucency of the element 202 means that any other elements, or anything else, being displayed within the screen 200 that are underneath the element 202 can show through the element 202 to the extent allowed by the translucency of the element 202. The net effect in one embodiment is that the element 202 does not completely cover any elements (or anything else) underlying it, such that everything is viewable. In one embodiment, translucency is achieved by setting what is know in the art as the alpha-blending value, or simply the alpha value, of the element 202 to a predetermined percentage, such as 10%, where a 100% percentage corresponds to no translucency (viz., complete opacity).

Figure 3:
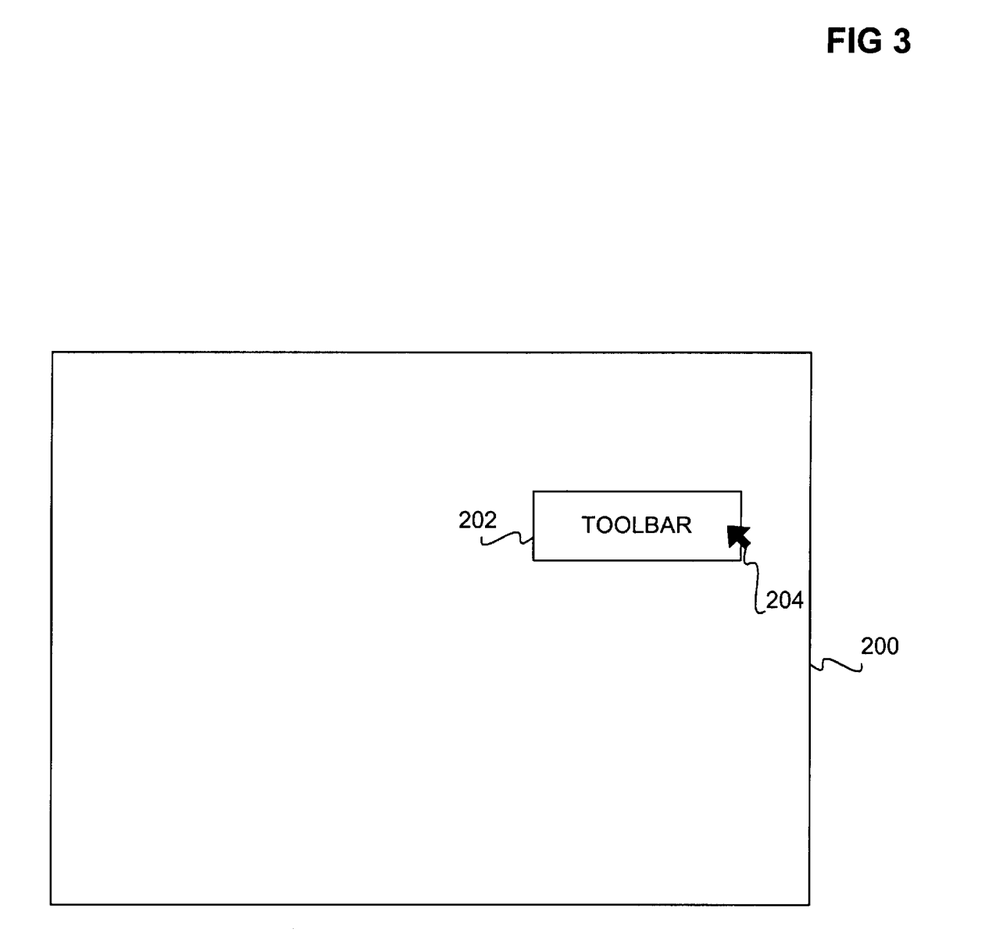

However, when the pointer is moved such that it is positioned over the element 202, the element 202 becomes opaque. This is shown in FIG. 3, in which the pointer 204 is positioned over the graphical user interface element 202 within the display screen 200. In FIG. 3 the graphical user interface element 202 has a solid-line boundary, to indicate for illustrative purposes that it is in a second mode in which the element 202 is displayed in an opaque manner. This opaque mode generally applies when the pointer 204 is positioned over the element 202, as is the case in FIG. 3, although extensions and variations described in the next section of the detailed description can deviate from this. Opacity of the element 202 means that, in one embodiment, other elements, or anything else, being displayed within the screen 200 that are underneath the element 202 cannot substantially (or more) be seen through the element 202. In one embodiment, opacity is achieved by setting the alpha value of the element 202 to a second predetermined percentage higher than the predetermined percentage to which the value is set for translucency, such as 100%.

It is noted that in some embodiments of the invention, the element 202 becoming opaque can correspond with the element 202 receiving subsequent mouse button clicks, such that the user can activate buttons, radio buttons, check boxes, etc., within the element 202 via the pointing device's mouse buttons. That is, by moving the pointer over the element 202 such that the element 202 becomes opaque, the user can then use the pointing device's mouse buttons to select the element 202, or parts thereof. However, the invention itself is not so limited.

In the embodiment of the invention described in this section of the detailed description, a graphical user interface element is translucent when a pointer is not positioned thereover, and is opaque when the pointer is positioned thereover. In one embodiment, translucency and opacity are achieved by varying the alpha value of the element. In the next section of the detailed description, various heuristics as to when the element becomes opaque and/or translucent are described.

Variations and Extensions

In this section of the detailed description, different variations and extensions to the embodiment of the invention described in the previous section, according to varying embodiments of the invention, are presented. None of these variations or extensions, however, represents a limitation or restriction on the invention itself. Furthermore, at least some of the variations and extensions described herein can be implemented in conjunction with others, or alone. It is noted that, consistent with usage in the previous section of the detailed description, where a graphical user interface element is referenced in this section in a drawing in which it is shown as having a dotted-line border, this indicates that the element is translucent in that drawing. Likewise, where such an element is shown with a solid-line border in a drawing, this means that the element is opaque therein.

In one embodiment, a graphical user interface element does not immediately go from translucent to opaque when the pointer is moved such that it is positioned over the element (from, for example, a position where the pointer was not over the element). Rather, in this embodiment, there is a delay for a predetermined amount of time before the element becomes opaque (viz., before it enters the opaque mode from the translucent mode). So, for example, if a user is merely passing the pointer over the element, without intending to ultimately rest the pointer over the element, the element will likely not become opaque.

Figure 4:
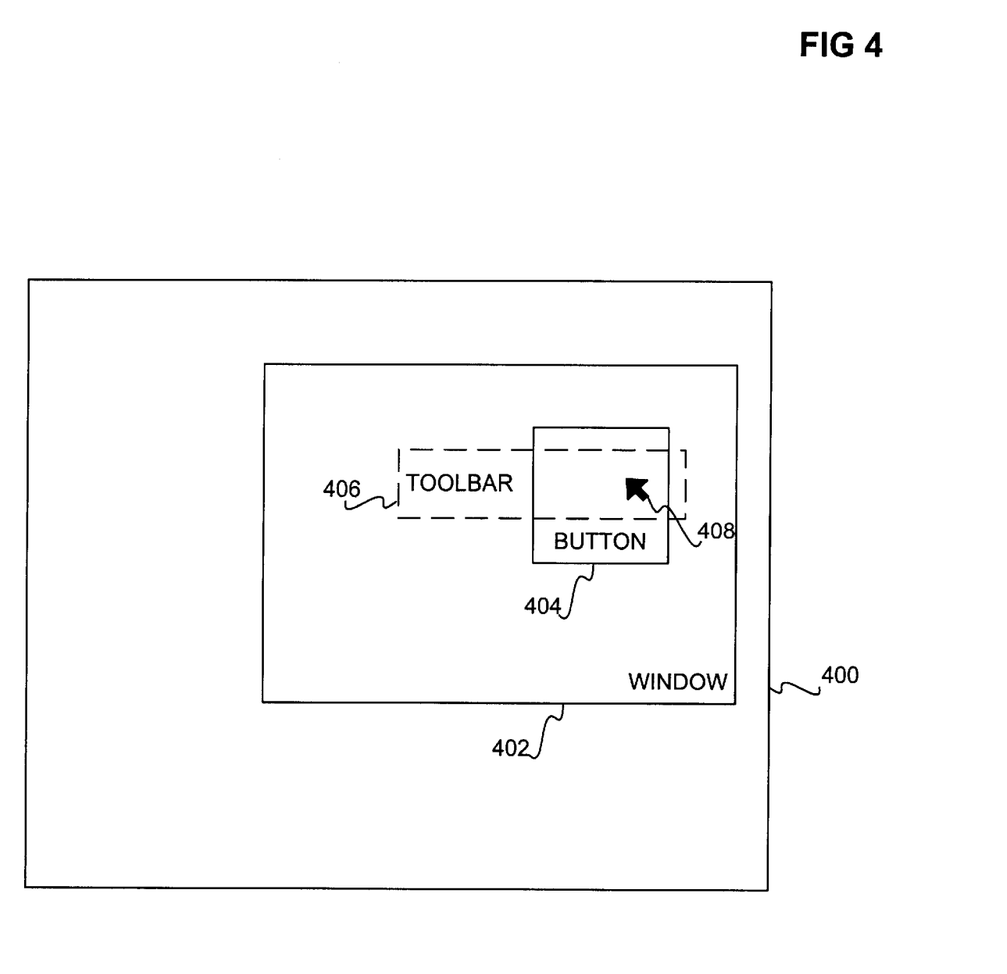
FIG. 4 is a diagram illustrating an embodiment of the invention in which a second graphical user interface element underneath a first graphical user interface element nevertheless receives mouse button clicks from the user, since the first element is still translucent even though the pointer is positioned thereover.

In one embodiment, this delayed opacity corresponds to delayed receipt by the graphical user interface element of mouse button clicks. That is, mouse button clicks are not received by the element even if the pointer is positioned over the element, but only when the element becomes opaque. This is shown in the diagram of FIG. 4. In the display screen 400, there is a window 402 with a button 404 displayed underneath the toolbar 406. Both the window 402 and the toolbar 406 are graphical user interface elements, while the button 404 is another element that is specifically within and part of the window 402. The pointer 408 is positioned over the toolbar 406, and over the button 404 of the window 402. However, the pointer 408 has only recently been moved to its position as shown in FIG. 4, such that the toolbar 406 has not yet become opaque, but rather remains translucent. Therefore, mouse buttons clicks will be received not by the toolbar 406, but by the window 402, and more specifically the button 404 of the window 402. The toolbar 406 in this embodiment will not receive mouse button clicks until the toolbar 406 becomes opaque, after the predetermined amount of time of delay.

Figure 5:
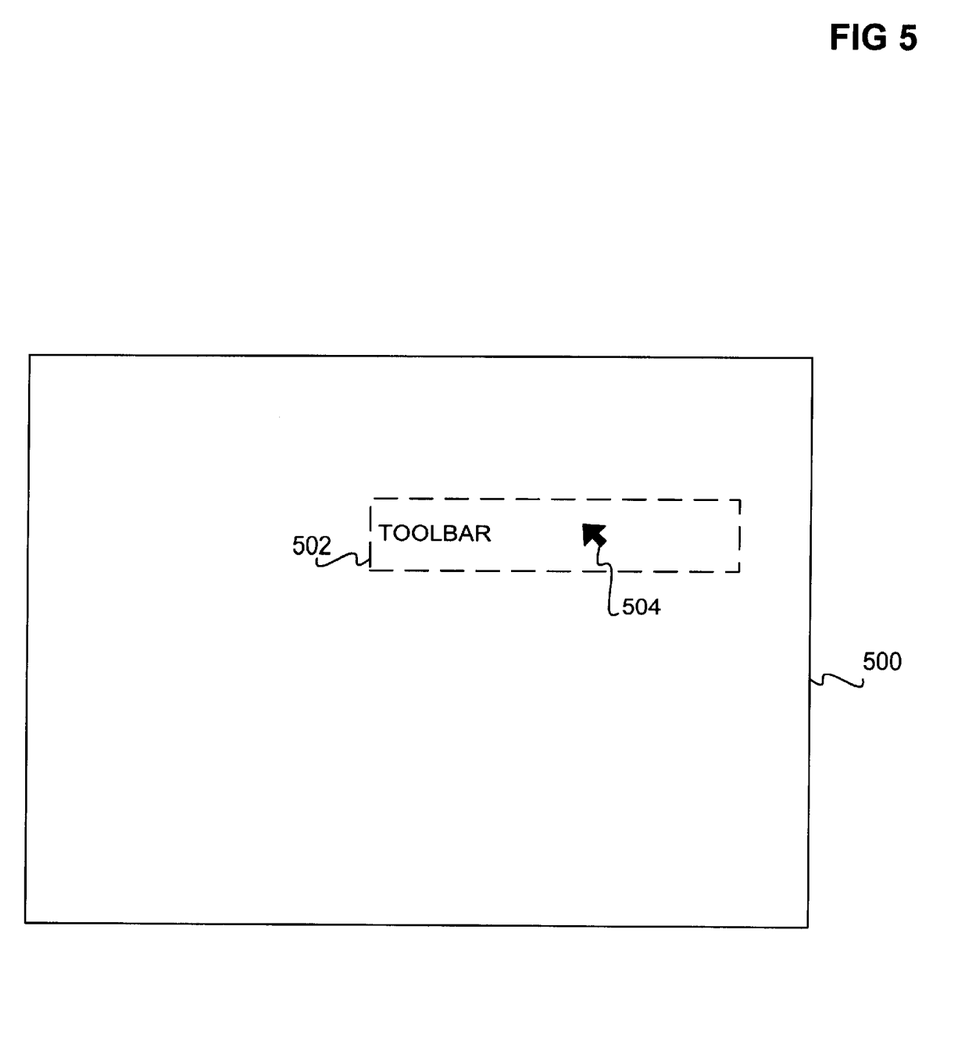
FIGS. 5 and 6 are diagrams illustrating an embodiment of the invention in which a graphical user interface element becomes translucent after a predetermined amount of time in which a pointer positioned thereover has not moved, and then becomes opaque once the pointer is moved but is still positioned thereover.
Figure 6:
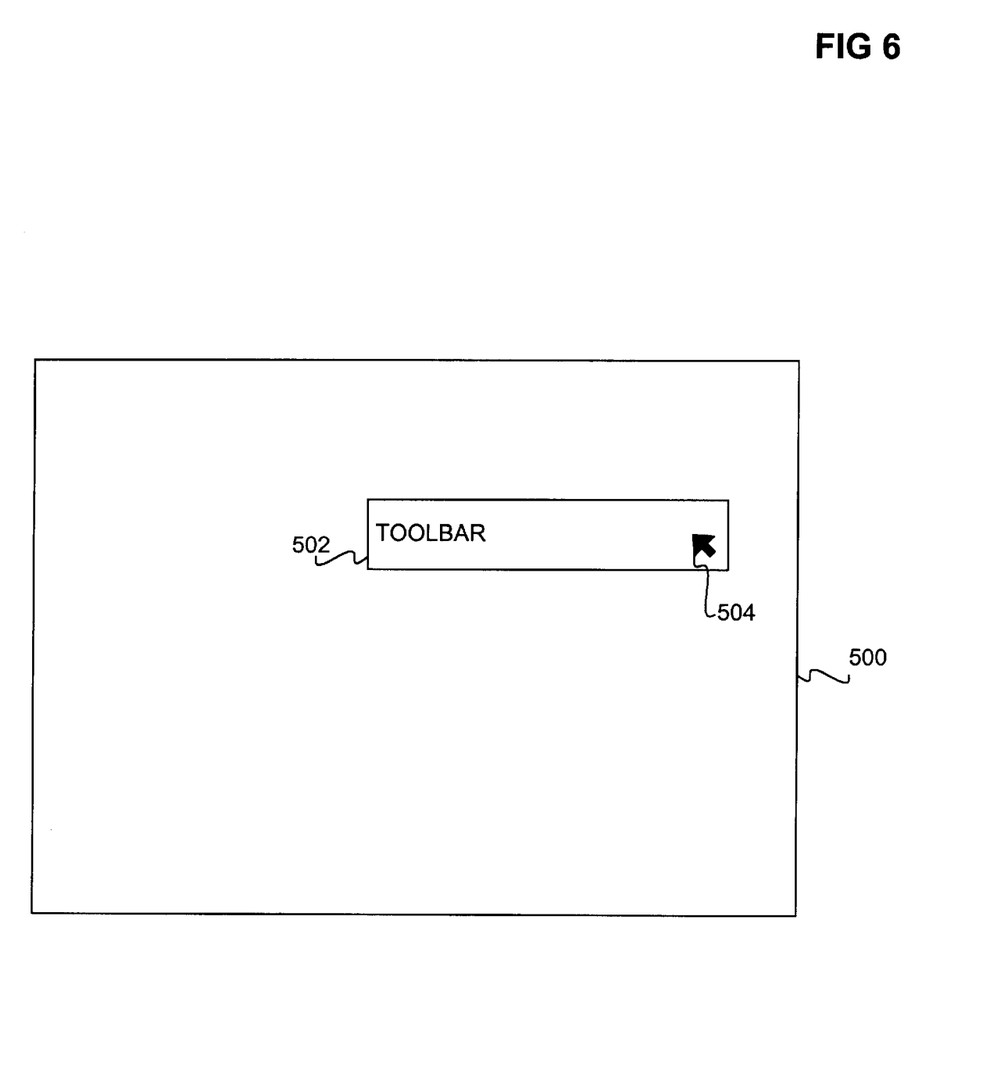

In another embodiment of the invention, once the pointer has remained stationary over a graphical user interface element for a predetermined amount of time after the element has become opaque, the element reverts back to translucency. This is shown in the diagram of FIG. 5, where the toolbar 502 of the display screen 500 is translucent after having been opaque, because the pointer 504 has remained in a stationary position over the toolbar 502 for more than the predetermined amount of time. It is noted that in one embodiment, in such instances where a graphical user interface element has become translucent due to pointer non-movement, mouse button clicks are received by the graphical user interface element underneath (if any), as has been described in the previous paragraph, and not by the translucent element. Furthermore, movement of the pointer after the element has become translucent, such that the pointer is still positioned over the element, results in the element becoming opaque again. This is shown in the diagram of FIG. 6, where the toolbar 502 of the display screen 500 is again opaque after having been translucent in FIG. 5, because the pointer 504 has moved to the right as compared to its position in FIG. 5 (and presumably has not remained stationary in its new position for more than the predetermined amount of time which would again cause the toolbar 502 to become translucent).

Figure 7:
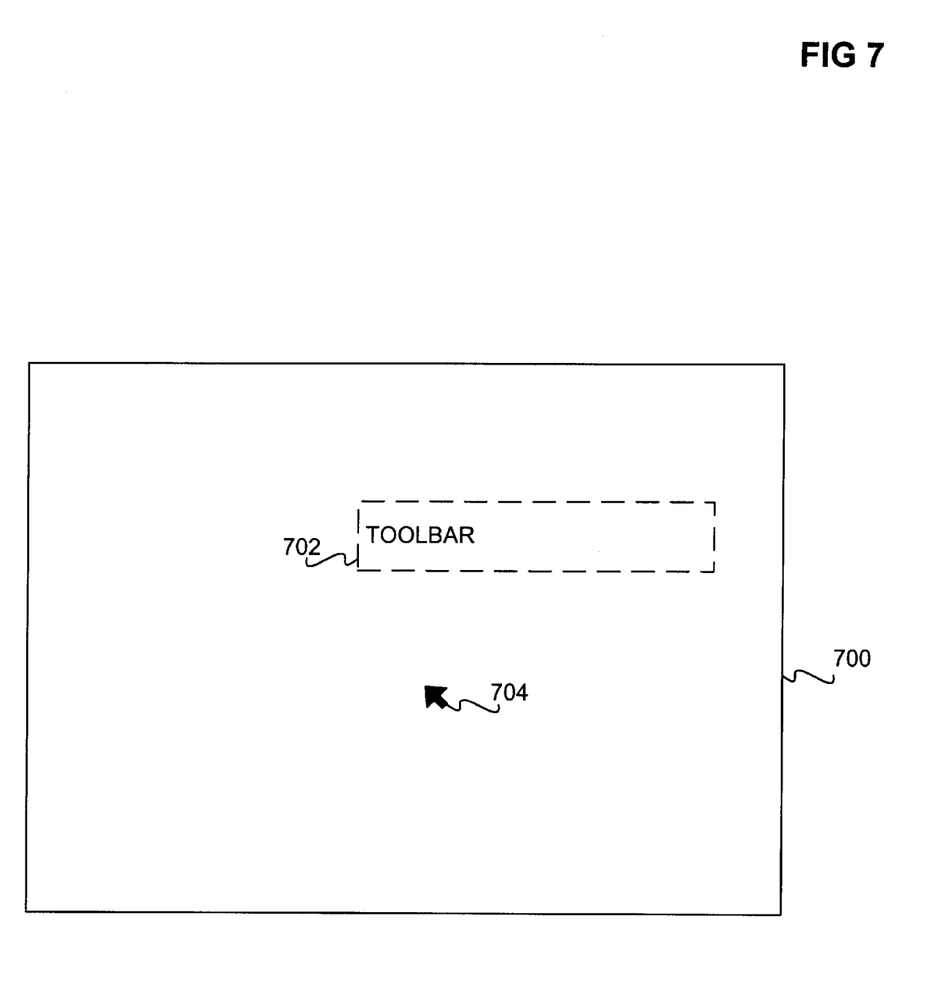
FIGS. 7 and 8 are diagrams illustrating an embodiment of the invention in which a graphical user interface element switches appearances along with translucency and opacity depending on the position of a pointer; and, FIG. 9 is a flowchart of a method according to an embodiment of the invention.
Figure 8:
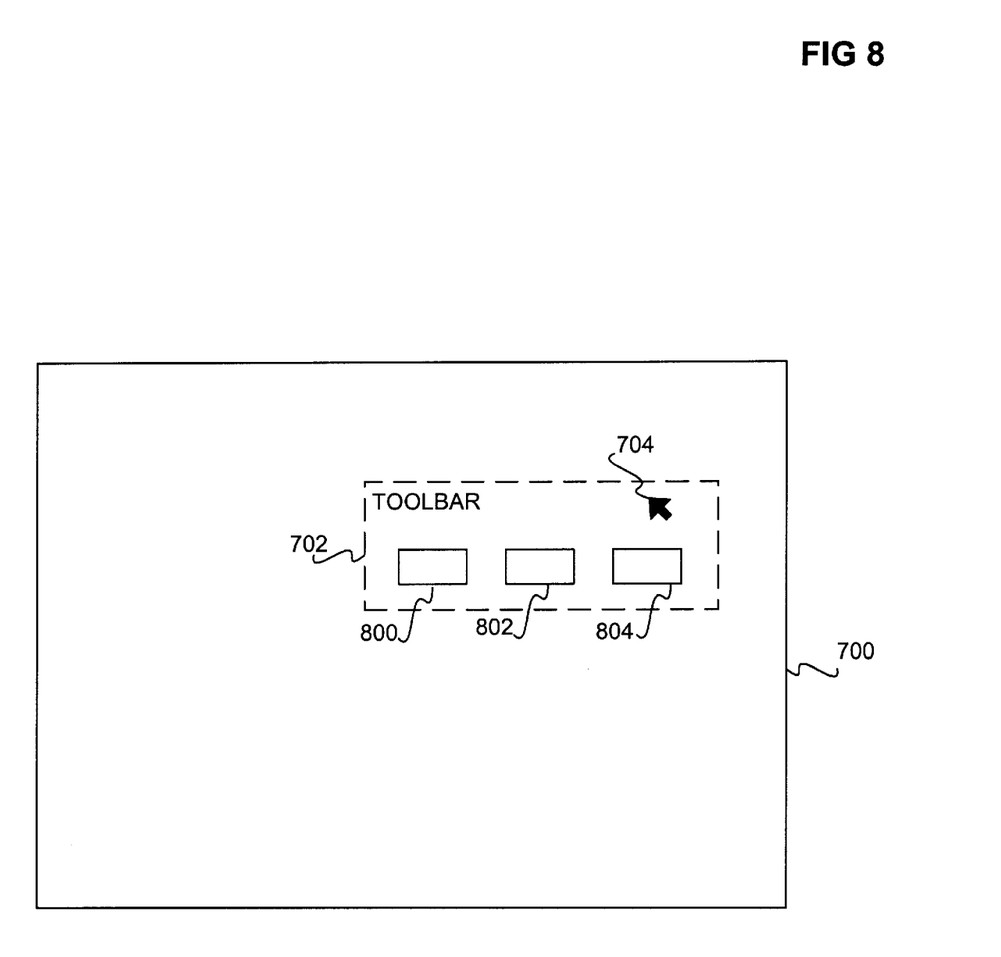

In another embodiment of the invention, a graphical user interface element has a different appearance depending on whether it is opaque or translucent. As an example only of this embodiment, an element may have a first appearance while it is translucent in which the element is shown smaller, with only important information being displayed therein, while the element may have a second appearance while it is opaque in which the element is shown larger, with user-clickable buttons also being displayed (for instance). This is shown by comparison of FIG. 7 with FIG. 8. In FIG. 7, a toolbar 702 within a display screen 700 is shown as having a certain appearance; the toolbar 702 in FIG. 7 is translucent on account of the pointer 704 not being positioned thereover. In FIG. 8, the toolbar 702 within the display screen 700 is now shown as having.a different appearance than that of FIG. 7, specifically now including user-clickable buttons 800, 802 and 804; the toolbar 702 in FIG. 8 is opaque on account of the pointer 704 now being positioned thereover.

In another embodiment of the invention, a sound can be played in conjunction with a graphical user interface element becoming opaque and/or translucent, where the sound for an element becoming opaque can be the same or different than the sound for the element becoming translucent. Such sounds are generally referred to herein as audio heralds. The audio heralds provide audible confirmation to the user as to the transformation that is occurring to the element on the display screen.

Furthermore, in another embodiment of the invention, the graphical user interface element becomes opaque via voice activation (e.g., speech recognition, etc.). For example, a toolbar may be translucent. When the user says a predetermined phrase (or, in one embodiment, any speech), the toolbar becomes opaque.

Methods

In this section of the detailed description, methods according to varying embodiments of the invention are presented. The methods can in some embodiments be computer-implemented. A computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

Figure 9:
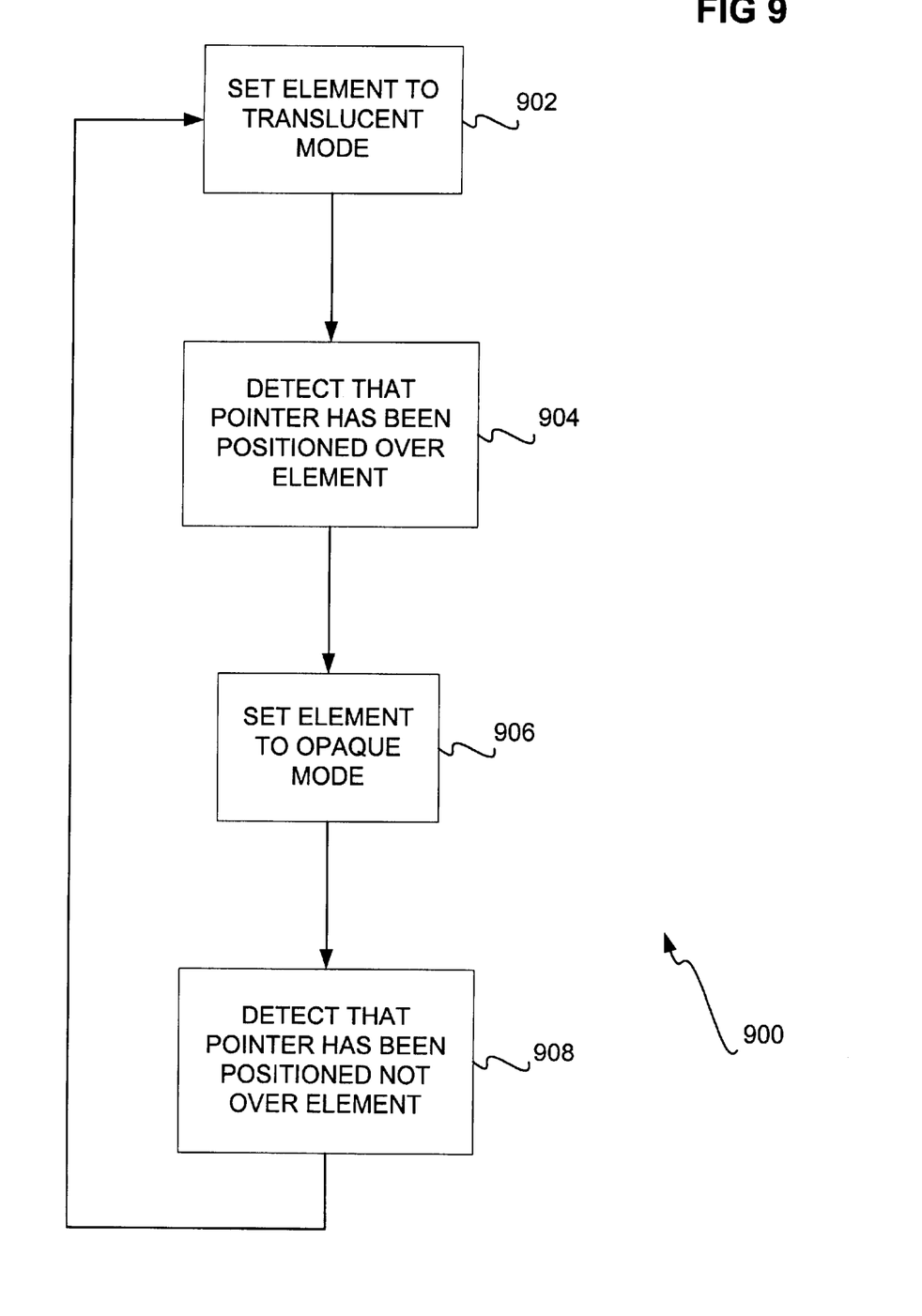

Referring to FIG. 9, a flowchart of a method 900 according to an embodiment of the invention is shown. In 902, a graphical user interface element is set to a translucent (first, or default) mode, in which the element is displayed in a translucent manner on a display screen, corresponding to the situation where the pointer is not positioned over the element. For example, translucence of the element can be achieved by setting the alpha value of the element to a predetermined percentage, such as 10%. In 904, the method detects when the pointer has been positioned over the element. In response to this detection, in 906, the element is set to an opaque (second) mode, in which the element is displayed in an opaque manner on the display screen. For example, opacity of the element can be achieved by setting its alpha value to a predetermined percentage greater than that when it is translucent, such as 100%. When in 908 the method detects that the pointer is again not positioned over the element, the element is re-set to the translucent mode in 902.

Different variations and extensions to the method 900 of FIG. 9 are also permitted under the invention, such as those described in the previous section of the detailed description. For example, in 906, the element may not be rendered opaque until a predetermined amount of time has been delayed. During this time, mouse clicks may be received by a graphical user interface element underneath the still-translucent element in one embodiment (viz., registered through to the element underneath the still-translucent element). As another example, in 908, that the pointer has been stationary over the element for a predetermined amount of time (e.g., no pointer movement for this amount of time) may also be detected such that the element is rendered translucent in 902, such that in one embodiment mouse clicks may be received by an element underneath the now-translucent element. Subsequent detection in 904 is then of pointer movement such that the pointer is still positioned over the element. In addition, the element may have a different appearance depending on whether it is translucent or opaque, and/or an audio herald may be played when the element becomes either translucent or opaque.

Conclusion

It is noted that, although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A computer-implemented method comprising:
   setting a graphical user interface element to a default, first mode in which the element appears translucent, a pointer not initially positioned over the element;
   detecting whether the pointer has been moved such that it is now positioned over the element; and
   upon detecting that the pointer is now positioned over the element, setting the element to a second mode in which the element appears opaque and in which the appearance of the element is altered such that the dimension or presented features in said second mode is different than said first mode.

2. The method of claim 1, wherein the graphical user interface element comprises a toolbar.

3. The method of claim 1, wherein the element appears translucent in the first mode by setting an alpha value of the element to a first predetermined percentage.

4. The method of claim 3, wherein the element appears opaque in the second mode by setting the alpha value to a second predetermined percentage greater than the first predetermined percentage.

5. The method of claim 1, wherein setting the element to the second mode initially comprises waiting for a predetermined amount of time prior to setting the element to the second mode.

6. The method of claim 5, further comprising allowing mouse clicks to register through to a second graphical user interface element under the first graphical user interface element while waiting for the predetermined amount of time prior to setting the second graphical user interface element to the second mode.

7. The method of claim 1, further comprising setting the element back to the first mode upon detecting no pointer movement for a predetermined amount of time.

8. The method of claim 7, further comprising allowing mouse clicks to register through to a second graphical user interface element under the element after the element has been set back to the first mode.

9. The method of claim 7, further comprising setting the element to the second mode upon detecting pointer movement and such that the pointer is still positioned over the element.

10. The method of claim 1, further comprising:
   detecting whether the pointer has been further moved such that it is no longer positioned over the element; and,
   upon detecting that the pointer is no longer positioned over the element, setting the element back to the first mode in which the element appears translucent.

11. The method of claim 1, further comprising setting the element to the second mode in which the element appears opaque via voice activation.

12. A machine-readable medium having instructions stored thereon for execution by a processor of a computer to perform a method comprising:
   detecting whether a pointer has moved from over a graphical user interface element to not over the element;
   upon detecting that the pointer has moved from over the element to not over the element, rendering the element translucent;
   detecting whether the pointer has moved from not over the element to over the element; and,
   upon detecting that the pointer has moved from not over the element to over the element, rendering the element opaque and altering the appearance of the opaque element such that the dimension or presented features is different than the translucent element.

13. The medium of claim 12, wherein upon detecting that the pointer has moved from not over the element to over the element, initially waiting for a predetermined amount of time prior to rendering the element opaque.

14. The medium of claim 13, further comprising allowing mouse clicks to register through to a second graphical user interface element under the element while waiting for the predetermined amount of time prior to rendering the element opaque.

15. The medium of claim 12, further comprising rendering the element translucent upon detecting no pointer movement for a predetermined amount of time.

16. The medium of claim 15, further comprising allowing mouse clicks to register through to a second graphical user interface element under the element after the element has been rendered translucent and the pointer is still positioned over the element.

17. The medium of claim 15, further comprising rendering the element opaque upon detecting pointer movement and such that the pointer is still positioned over the element.

18. The medium of claim 12, the method further comprises rendering the element opaque via voice activation.

19. A graphical user interface for a computerized system comprising:
   a user-movable pointer; and,
   a graphical user interface element having a first mode in which the element is translucent when the pointer is not positioned thereover, and a second mode in which the element is opaque when the pointer is positioned thereover;
   wherein the appearance of said graphical user interface element is altered such that the dimension or presented features in said second mode is different than in said first mode.

20. The user interface of claim 19, wherein when the pointer is positioned over the graphical user interface element, the element waits for a predetermined amount of time prior to entering the second mode.

21. The user interface of claim 19, further comprising a second graphical user interface element under the element that receives mouse clicks while the element waits for the predetermined amount of time prior to entering the second mode.

22. The user interface of claim 19, wherein when the pointer has been positioned over the graphical user element for a predetermined amount of time with no movement, the element re-enters the first mode.

23. The user interface of claim 22, further comprising a second graphical user interface element under the element that receives mouse clicks when the element re-enters the first mode.

24. The user interface of claim 22, wherein the element again enters the second mode when the pointer is moved but is still positioned over the element.

25. The user interface of claim 22, wherein the element enters the second mode further via voice activation.

* * * * *